July 7, 1964    H. H. FERRELL ETAL    3,139,747
FLOW REGULATOR
Filed July 3, 1961
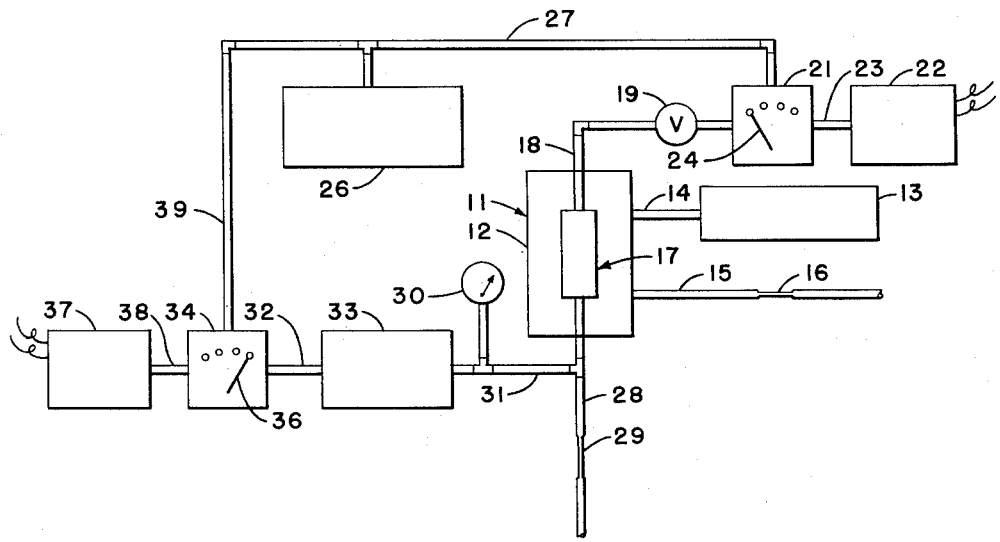
FIG. 1
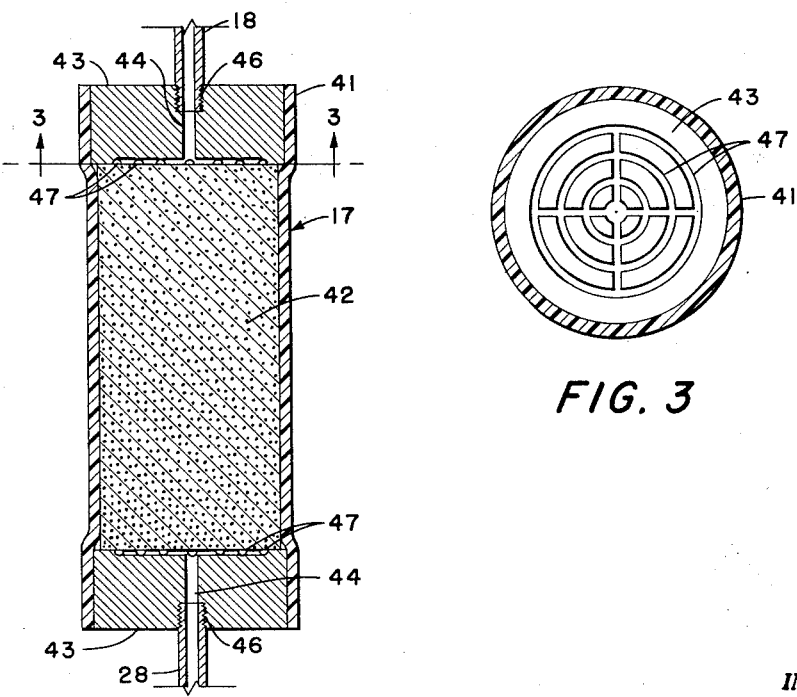
FIG. 2
FIG. 3
INVENTORS.
HOWARD H. FERRELL
CARROLL F. KNUTSON
BY David P. Cullen
ATTORNEY

United States Patent Office 3,139,747
Patented July 7, 1964

3,139,747
FLOW REGULATOR
Howard H. Ferrell and Carroll F. Knutson, Ponca City, Okla., assignors to Continental Oil Company, Ponca City, Okla., a corporation of Delaware
Filed July 3, 1961, Ser. No. 121,752
9 Claims. (Cl. 73—38)

This invention relates to a flow regulator and more particularly to a flow regulator for inducing flow in a relatively permeable work piece against a predetermined back-pressure.

It is not uncommon in industrial and scientific operations for the need to arise for apparatus which will produce a stream flow in a vessel or work piece against a predetermined back-pressure. For instance, in many chemical reactions, it is necessary for one of the constituents of the reaction to be introduced into a vessel against a predetermined pressure within the vessel. Similarly, it is often necessary when determining certain parameters of geological cores to flow a stream of liquid through the core against a predetermined back-pressure. Because of the relatively common need which arises for such apparatus, a number of devices have been designed which have limited application under certain specified conditions. One of the most common of such devices is the capillary restriction located in the outflow channel of a vessel in which predetermined back-pressure is desired. A number of more sophisticated mechanical devices have also been designed for producing the designed back-pressure. Commonly, such devices include rather complex mechanisms for either opening or closing valves or covering and uncovering apertures in response to the pressure established in a work area. These and other mechanisms have been found useful under certain restricted conditions; however, they are subject to disadvantages which have precluded their universal acceptance. Commonly, these devices are expensive and of such complex nature as to render malfunction common. On the other hand, the simple capillary restriction mentioned above is of limited use due to the direct relationship between flow volume and back-pressure produced by the tube. In situations where a variety of flow volumes are desired with a single predetermined back-pressure, a plurality of capillary restrictions would be necessary. Should it be desired to alter the flow volume without interrupting flow, the use of a plurality of capillary tubes becomes extremely impractical.

In one aspect, the present invention contemplates the use of a constant volume output pump, the output from which is directed to a predetermined work area. Passing from the work area is provided a conduit having a restriction therein for producing a back-pressure on the work area. Located between the restriction and the work area is a conduit leading from a constant pressure output pump.

It is an object of this invention to produce a flow regulator which is relatively simple and which has a wide latitude of application.

Another object of this invention is to produce a flow controller which makes possible a variety of flow volumes against a predetermined back-pressure.

An additional object of this invention is to provide a device for producing a predetermined volume of flow in a work piece against a predetermined back-pressure, wherein both the volume of the flow and the back-pressure may be easily adjusted.

Another object of the invention is to provide a flow regulator which is relatively inexpensive to construct and which has a long and trouble-free service life.

These and other objects and advantages of the invention will be evident from the following detailed description when read in conjunction with the accompanying drawings which illustrate the invention.

In the drawings:

FIGURE 1 is a schematic representation of the elements embodying one form of the present invention and illustrating one means for connecting said elements to achieve the desired results;

FIGURE 2 is a cross-sectional view showing a work holder with a geological core contained therein which may be used with the structure shown in FIGURE 1; and FIGURE 3 is a cross-sectional view taken along line 3—3 of FIGURE 2 and showing the arrangement of fluid channels within a portion of the work holder.

Referring now to the drawings in detail and in particular to FIGURE 1, there is shown a work area indicated generally at 11 in which it is desired to flow a vapor or fluid against a predetermined back-pressure. This work area includes an exterior pressure chamber 12 to which is attached a source of pressure 13 through a pipe or other passageway 14. While chamber 12 has particular application in certain circumstances, as for instance when it is desired to reproduce reservoir conditions in core studies, it is to be understood that the instant invention may be practiced without using such a chamber. The source of pressure 13 may consist of a pump, a pressure bomb, or other mechanisms well known in the art which will produce pressures up to about 150,000 p.s.i. Communicating with the interior of the pressure chamber 12 is an outlet 15 which has a restriction 16 such as a tube of capillary dimensions or larger, or a metering valve formed therein for creating a back-pressure within the pressure chamber. Located within the pressure chamber 12 is a work holder designated generally by the numeral 17 and shown in more detail in FIGURE 2 as hereinafter described. An inlet conduit 18 passes through the upper wall of pressure chamber 12 as viewed in FIGURE 1 and seats within the work holder 17. Secured to the inlet conduit 18 is means for controlling the flow therein such as the valve 19. Flow through the conduit 18 is furnished by constant volume output means such as a pump 21, which is actuated by means such as an electric motor 22 through a shaft 23. The constant volume output pump may be any one of several types well known in the art. One example of this type of pump is marketed by the Ruska Instrument Corporation of Houston, Texas, under the designation catalogue No. 2276. Pump 21 is attached to exterior control means 24 for changing the volumetric output of the pump as conditions require. Liquid is furnished to the pump from a source 26 through a conduit 27.

Secured to the lower portion of work holder 17, as viewed in FIGURE 1, and passing through the lower wall of pressure chamber 12, is a fluid passage 28. Spaced from pressure chamber 12 and formed within passage 28 is a restriction 29 which may be capillary in size. The size of this capillary is chosen to produce less than the required back-pressure in work area 11 for the volume emitting from pump 21. A channel member 31 having a pressure gauge 30 thereon is connected to fluid passage 28 at a point between restriction 29 and work area 11. Secured to the upstream end of member 31 is a means for storing a quantity of pressurized material such as a pressure chamber 33 which may be a simple open chamber or a pressure accumulator having a gas cushion or spring cushion such as is disclosed in Patent No. 2,752,754. This chamber functions to overcome minor fluctuations in the output flowing from a conduit 32 which is interposed between chamber 33 and a means for producing a constant pressure output such as a pump 34. This pump may be one of several types well known in the art, such as the pump sold by the Sprague Engineering Corporation of Gardena, California under the catalogue model designation S-216C-300. Pump 34 is connected to exterior control means 36 for changing the pump output pressure from about 1 p.s.i. to about 150,000 p.s.i. The control means may be one of any type well known in the art, such as gear ratio-changing mechanism or a pressure regulator controlling the inlet pressure of the fluid operating the pump. Motive force is furnished pump 34 by means such as a motor 37, through a shaft 38. Material is furnished to pump 34 from source 26 through a conduit 39.

Although a number of types of work holders or reaction vessels may be used satisfactorily with the apparatus disclosed herein, the structure shown in FIGURES 2 and 3 has been found to be of particular advantage when flow tests are being conducted on geological or artificial cores. This particular work holder includes a sleeve 41, which is formed of flexible, relatively impervious material such as rubber, plastic or nylon. Contained within the body of sleeve 41 is a relatively pervious core 42 through which it is desired to flow a fluid and/or gas against a predetermined back-pressure. On either end of the sleeve, in abutting relationship to core 42, are provided identical sealing means such as plugs 43, each of which has a fluid channel 44 formed axially therein. Extending from each of channels 44 is a pocket 46, the upper one of which secures one end of inlet conduit 18 and the lower one of which secures one end of fluid passage 28. The inner face of each of the plugs 43 is formed into a series of fluid grooves 47 to assure a linear flow of fluid throughout the length of the core.

In the operation of the structure disclosed in FIGURES 1, 2 and 3, a core 42 is first placed within sleeve 41; and plugs 43 are inserted into the ends of the sleeve exterior of core 42. The work holder 17 with core 42 therein is then placed within pressure chamber 12, and pressure is established therein from the source 13 through pipe 14. As pressure builds up within chamber 12, the contact between plugs 43 and sleeve 41 will be made secure due to the radially inward pressure on the flexible sleeve. In addition, the abutting relationship between plugs 43 and core 42 will also be insured due to the axial pressure thereon.

After chamber 12 has been pressurized, constant pressure pump 34 is actuated by motor 37; and adjustive means 36 is employed to obtain the back-pressure desired in the lower end of work holder 17. When the desired back-pressure has been impressed upon the lower portion of work holder 17 by pump 34 and pump 21 is actuated, valve 19 is opened whereby a given predetermined volume flows from pump 21 through valve 19 through inlet conduit 18 and into core 42 through threaded pocket 46 and aperture 44 in the upper plug 43. From upper plug 43, the fluid extends over the upper face of core 42 through fluid grooves 47 formed in the face of the plug. It should be kept in mind that as the fluid from pump 21 passes through core 42 it does so against the pressure set up by the combination of restriction 29 and pump 34.

Should it become necessary or desirable to alter either the back-pressure or the volume of flow through core 42, this may be accomplished by adjustments of the pressure changing means 36 or the volume adjusting means 24. Moreover, the volume may be changed independently of any change in back-pressure; and similarly, back-pressure may be changed independently of any change in volume of flow through the core. By utilizing high back-pressures in combination with high exterior pressures such as is established in pressure chamber 12, it is possible to substantially duplicate reservoir conditions in determining permeability and other characteristics of a core sample.

Changes may be made in the combination and arrangement of parts or elements as heretofore set forth in the specification and shown in the drawings, it being understood that such changes may be made in the precise embodiment disclosed without departing from the spirit and scope of the invention as defined in the following claims.

We claim:

1. Apparatus for controlling flow conditions in a work area which comprises means for selectively producing a constant volume output, means for driving said output means, a conduit disposed between said constant output means and said work area for directing flow therebetween, an outflow conduit for channeling flow away from said area, a restriction in said outflow conduit, means for selectively producing and automatically maintaining a constant pressure output independently of changes in the volumetric output of said means for selectively producing a constant volume output, means for actuating said last-named means, and channeling means for directing flow from said constant pressure output means to said outflow conduit at a point between said restriction and said work area.

2. Apparatus as defined in claim 1 wherein said means for producing a constant volume output is a pump and wherein said means for producing a constant pressure output is a pump.

3. Apparatus as defined in claim 2 wherein said restriction is a capillary tube.

4. Apparatus as defined in claim 3 wherein a pressure chamber is located within said channeling means.

5. Apparatus for controlling the flow conditions through a relatively permeable work piece which comprises a work piece holder in contact with at least one surface of said work piece, a plurality of apertured sealing members in contact with both the work piece and the work piece holder, means for selectively producing a constant volume output, means for driving said output means, a conduit disposed between said output means and one of said apertured sealing members for directing flow therebetween, an outflow conduit attached to another of said apertured sealing members for channeling flow away from said member, a restriction in said outflow conduit, means for selectively producing and automatically maintaining a constant pressure output independently of changes in the volumetric output of said means for selectively producing a constant volume output, means for actuating said last-named means, and channeling means for directing the flow from said constant pressure output means to said outflow conduit at a point between said restriction and said last-named apertured sealing member.

6. The apparatus as defined in claim 5 wherein said work piece holder is a relatively flexible sleeve formed around said work piece and wherein each of said sealing members comprises an apertured plug located at least partially within said sleeve and in abutting relationship with said work piece.

7. The apparatus as defined in claim 6 wherein a pressure chamber is formed around said sleeve and said plugs and wherein a source of pressure is connected to said pressure chamber whereby predetermined external pressure is transmitted to said work piece through said flexible sleeve.

8. The apparatus as defined in claim 7 wherein said means for producing a constant volume output is a pump and said means for producing constant pressure output is a pump and wherein said restriction is a capillary tube.

9. The apparatus as defined in claim 8 wherein a valve is in engagement with said conduit for shutting off the flow therein and wherein a pressure chamber is secured to said channeling means.

References Cited in the file of this patent

UNITED STATES PATENTS

| | | |
|---|---|---|
| 2,618,151 | Leas | Nov. 18, 1952 |
| 2,737,804 | Herzog et al. | Mar. 13, 1956 |
| 2,842,958 | Sayre | July 15, 1958 |

FOREIGN PATENTS

| | | |
|---|---|---|
| 1,063,832 | Germany | Aug. 20, 1959 |